United States Patent
Tomoschuk et al.

(10) Patent No.: US 12,415,524 B2
(45) Date of Patent: Sep. 16, 2025

(54) AUTOMATED COMFORT SCORE

(71) Applicant: GM Cruise Holdings LLC, San Francisco, CA (US)

(72) Inventors: Brendan Tomoschuk, San Diego, CA (US); Sofya Pugach, Somerville, MA (US); Xiao Lin, Campbell, CA (US); Vladyslav Mysla, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 255 days.

(21) Appl. No.: 18/053,970

(22) Filed: Nov. 9, 2022

(65) Prior Publication Data

US 2024/0149888 A1  May 9, 2024

(51) Int. Cl.
*B60W 50/00* (2006.01)
*B60W 40/02* (2006.01)
*G06Q 50/40* (2024.01)
*G08G 1/00* (2006.01)

(52) U.S. Cl.
CPC ........ *B60W 50/0098* (2013.01); *B60W 40/02* (2013.01); *G06Q 50/40* (2024.01); *G08G 1/20* (2013.01); *B60W 2050/0028* (2013.01); *B60W 2050/0052* (2013.01); *B60W 2520/105* (2013.01); *B60W 2540/18* (2013.01); *B60W 2554/80* (2020.02); *B60W 2556/10* (2020.02)

(58) Field of Classification Search
CPC ............ B60W 50/0098; B60W 40/02; B60W 2050/0028; B60W 2050/0052; B60W 2520/105; B60W 2540/18; B60W 2554/80; B60W 2556/10; G06Q 50/40; G08G 1/20
See application file for complete search history.

(56) References Cited

U.S. PATENT DOCUMENTS

| | | | |
|---|---|---|---|
| 2020/0406906 A1* | 12/2020 | Omari | G05D 1/0223 |
| 2021/0229704 A1* | 7/2021 | Zhu | B60W 50/10 |
| 2024/0182039 A1* | 6/2024 | Chatni | B60W 40/109 |

OTHER PUBLICATIONS

Unpublished US Non-Provisional Application entitled, "System and Method for Evaluating Ride Service Facilitied by Autonomous Vehicle", filed Jul. 29, 2022, U.S. Appl. No. 17/815,980, 64 pages.

\* cited by examiner

*Primary Examiner* — Vladimir Magloire
*Assistant Examiner* — Ashley Brown Raynal
(74) *Attorney, Agent, or Firm* — Honigman LLP; Matthew H. Szalach; Jonathan P. O'Brien (57) ABSTRACT

Systems and methods for providing kinematic and contextual comfort scores to autonomous vehicle rides. In particular, systems and methods are provided to automatically identify driving events such as unusual acceleration, braking, and steering events, and determine the severity of identified events. Some example events include a hard braking event, a swerve event, and a quick acceleration event. Automatic detection of such events allows for engineering feedback to autonomous vehicles and provides a tool for capturing passenger satisfaction and/or reactions with regard to specific events.

20 Claims, 7 Drawing Sheets

AUTOMATED COMFORT SCORE

BACKGROUND

1. Technical Field

The present disclosure generally relates to vehicle comfort and, more specifically, to comfort ratings for vehicle rides.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles. When driving around, autonomous vehicles, like other vehicles, can drive over road debris that can damage the vehicle tires.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Autonomous vehicles provide driverless ride services, allowing a user to request a ride from a pick-up location to a destination location. With the autonomous driving features of the autonomous vehicle, the user is a passenger in the vehicle and there is no human driver. The autonomous vehicle can navigate from the pick-up location to the drop-off location with no or little user input. To improve ride services provided by autonomous vehicles, it is important to evaluate ride comfort for rides provided by autonomous vehicles ("autonomous vehicle rides") and to identify events that cause user satisfaction and dissatisfaction. Currently available technology for evaluating ride services relies on limited metrics to evaluate user experiences, such as passenger feedback, which is highly subjective. Therefore, improved technology for objectively evaluating ride services is needed.

Systems and methods are provided herein to provide kinematic and contextual comfort to passengers. In particular, systems and methods are provided to automatically identify driving events such as unusual acceleration, braking, and steering events, and determine the severity of identified events. Some example events include a hard braking event, a swerve event, and a quick acceleration event. Automatic detection of such events allows for engineering feedback to autonomous vehicles and provides a tool for capturing passenger satisfaction and/or reactions with regard to specific events.

In some implementations, an automated comfort score is generated for a ride segment that reflects the comfort of the ride segment for a passenger based on detected events. The events include any events that affect ride quality, such as acceleration, braking, and steering events. In particular, ride segments are filtered to include uncomfortable road segments, wherein the determination of an uncomfortable road segment is based on vehicle accelerometer data and steering sensor data. A machine learning module is used to integrate data on the proximity of pedestrians, animals, and other road users. The machine learning module learns autonomous vehicle driving patterns and identifies outliers. Based on the identified outliers, the machine learning module flags various road segments as uncomfortable. Kinematic data is used to determine a severity score for each flagged road segment. The aggregate severity score values for a given ride segment can be used to generate an automated comfort score metric that indicates which autonomous vehicle rides are uncomfortable. In some examples, the automated comfort score metric can be used to indicate that an autonomous vehicle software releases results in uncomfortable rides.

According to various implementations, the systems and techniques provided herein utilize sensor data to generate a measure of passenger comfort. Sensor data can include kinematic data as well as contextual data such as proximity to another road user, pedestrian, animal, or vehicle. The combination of kinematic and contextual sensor data provides a more accurate account of a passenger experience of a vehicle hard brake or swerve. In particular, a hard brake in which the vehicle almost hits another road user is more uncomfortable for a user than a regular hard brake. Additionally, the multi-stage process for generating the automated comfort zone score is more efficient than traditional models. Furthermore, real-time feedback can be provided to passengers, triggered by an outlier event, which can help reassure passengers as well as apologize to and/or compensate passengers for any discomfort.

Example Vehicle for Automated Comfort Score

Figure 1:
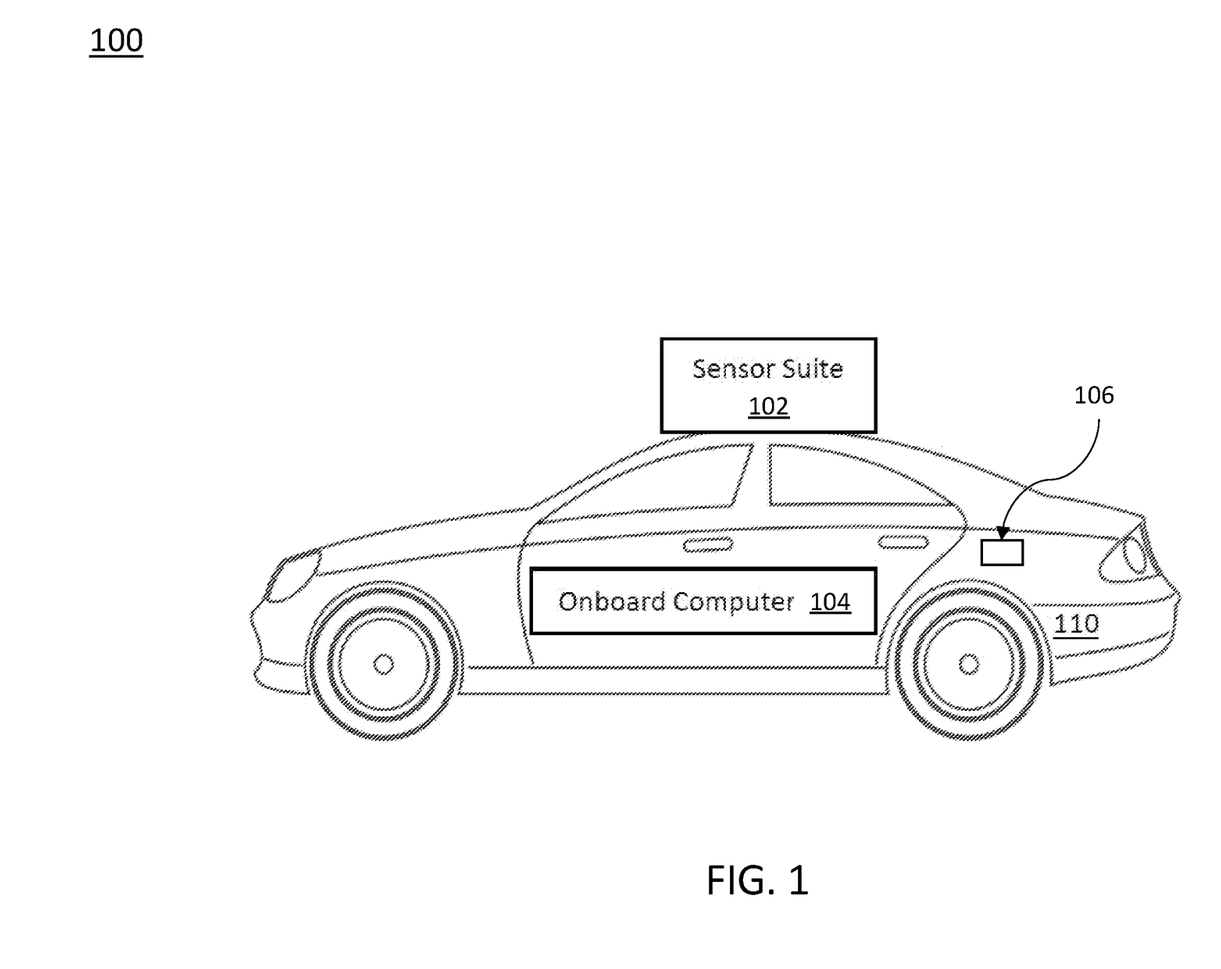
FIG. 1 illustrates an autonomous vehicle having an automated comfort score module for evaluating ride comfort, according to some examples of the present disclosure.

FIG. 1 illustrates an autonomous vehicle 110 having an automated comfort score module 106 for evaluating ride comfort, according to some examples of the present disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 can connect with a central computer to download vehicle updates, maps, and other vehicle data. The automated comfort score device 106 uses vehicle sensor data, such as data from the sensor suite 102, as well as other accelerometer and/or steering sensor data, to generate an automated comfort score as described herein.

The sensor suite 102 includes localization and driving sensors. For example, the sensor suite 102 may include one or more of photodetectors, cameras, radio detection and ranging (RADAR), sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. In some examples, data from the sensor suite 102 can be used to update a map with information used to develop layers with waypoints identifying various detected items, such as areas with high quantities of road debris, and/or areas with metal infrastructure. Additionally, sensor suite 102 data can provide localized traffic information, ongoing roadwork information, and current road condition information. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Additionally, the onboard computer 104 processes data for the automated comfort score device 106, and can use sensor suite 102 data for generating the automated comfort score. In some examples, the onboard computer 104 checks for vehicle updates from a central computer or other secure access point. In some examples, a vehicle sensor log receives and stores processed sensed sensor suite 102 data from the onboard computer 104. In some examples, a vehicle sensor log receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example System for Generating an Automated Comfort Score

Figure 2:
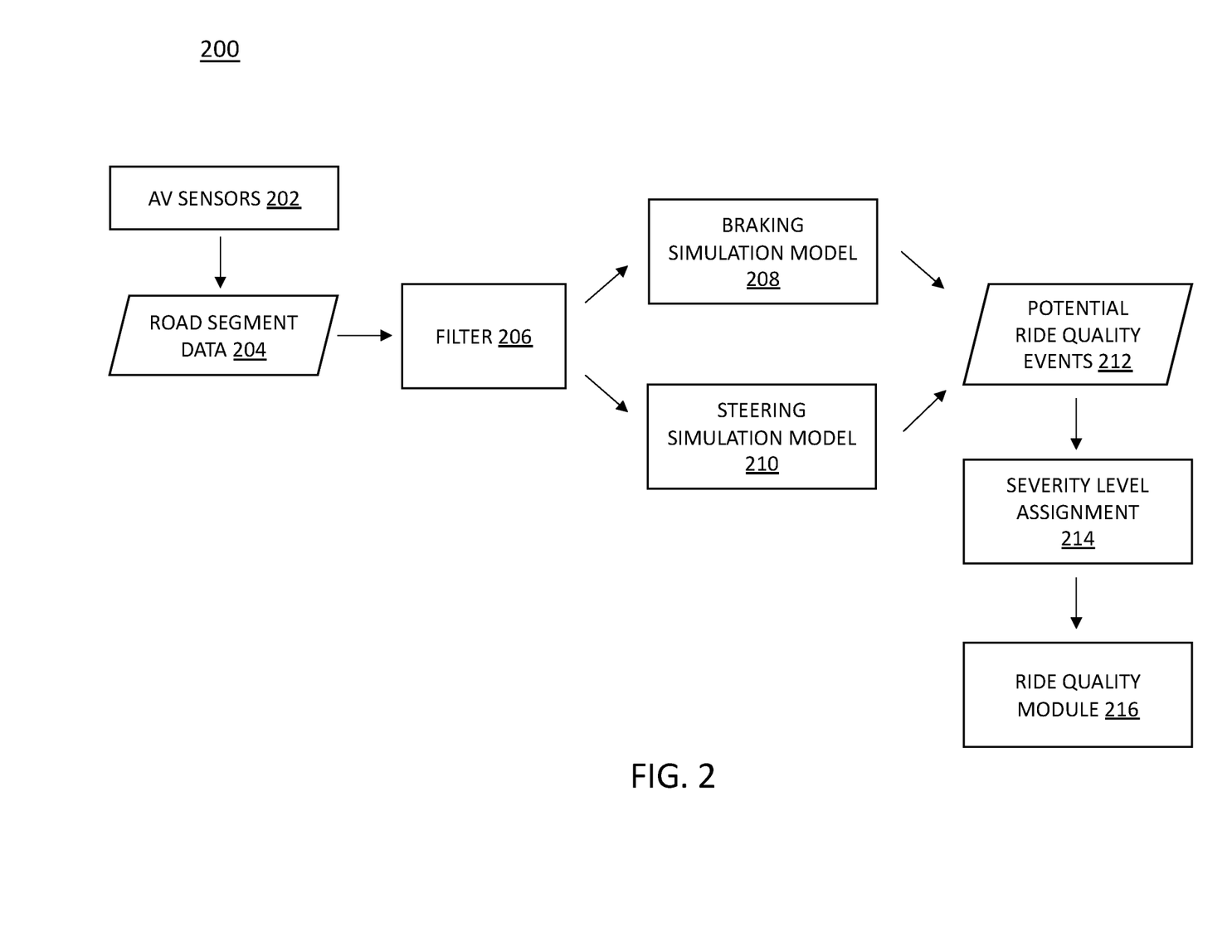
FIG. 2 is a block diagram illustrating an example of a system for generating an automated comfort score, according to some examples of the present disclosure.

FIG. 2 is a block diagram illustrating an example of a system 200 for generating an automated comfort score, according to some examples of the present disclosure. The system includes autonomous vehicle sensors 202, a filter 206, a braking simulation model 208, and a steering simulation model 210. The automated comfort score system 200 includes road segment data 204, which is based on data from the autonomous vehicle sensors 202. The automated comfort score system 200 also includes output data in the form of ride quality events 212. The ride quality events 212 output by the automated comfort score system 200 can be used to determine an automated comfort score for a corresponding road segment of the road segment data 204.

The autonomous vehicle sensors 202 include accelerometers as well as steering sensors. The accelerometers generate data for acceleration and deceleration in the longitudinal direction as well as data for acceleration and deceleration in the latitudinal direction. The accelerometer data can be used to determine acceleration and deceleration of the autonomous vehicle in any selected direction. Steering sensors generate data on changes in wheel direction as well as changes in vehicle direction. Thus, steering sensor data can be used to identify vehicle swerving or other abrupt directional changes. Additionally, autonomous vehicle sensors 202 include sensors used to determine the proximity of pedestrians, animals, and other road users to the autonomous vehicle, such as LIDAR sensors, radar sensors, and image sensors.

The autonomous vehicle sensors 202 generate road segment data 204. The road segment data 204 includes data for a plurality of road segments. A road segment can include data for a selected period of time a vehicle has driven (e.g., 5 seconds of driving, 10 seconds of driving, 30 seconds of driving, or more than 30 seconds of driving). In some examples, a road segment includes data for a selected distance a vehicle has driven (e.g., 10 yards of driving, 30 yards of driving, 50 yards of driving, 100 yards of driving, or more than 100 yards of driving). Ride data can be divided into road segments. In some examples, a passenger ride is divided into multiple road segments, and each road segment is evaluated by the automated comfort zone system 200.

For each road segment, sensor data for the duration of the road segment is included. In some examples, the road segments are filtered at a filter 206 to exclude road segments that are very unlikely to include any ride quality events. In particular, many road segments are uneventful and contain no potential outlier sensor data, and these uneventful road segments can be identified and filtered out before the road segment data 204 is transmitted to the simulation models 208, 210. In various examples, the determination of an uneventful road segment is based on vehicle accelerometer data and steering sensor data. Thus, in one example, uneventful road segments can be filtered out by removing road segments with a minimal change in speed (acceleration or deceleration below a selected threshold), and a minimal change in wheel direction and vehicle direction (steering direction change below a selected threshold).

The filter 206 receives the road segment data 204, and processes the data. The filter 206 also receives autonomous vehicle sensor data on the proximity of pedestrians, animals, and other road users to the autonomous vehicle. In some examples, pedestrians, animals, and other road users are referred to as non-player characters (NPCs). When an NPC is close to the autonomous vehicle, and the vehicle changes its speed and/or direction to create distance from the NPC and/or avoid hitting the NPC, the proximity of the NPC to the vehicle causing the vehicle speed and/or direction change can contribute to the discomfort of a passenger. Thus, the filter 206 identifies outliers in the road segment data 204 and integrates NPC proximity data to identify and flag additional road segment data 204. In particular, the filter 206 is designed to identify typical road segment patterns and identify outlier events from the road segment patterns. Outlier events include road segments with unusual changes in acceleration, deceleration, steering angle or direction, and road segments with NPCs in close proximity to the vehicle.

The filter 206 outputs the identified outlier event data to a braking simulation model 208 and a steering simulation model 210. In some examples, the outlier event data is output to both the braking simulation model 208 and the steering simulation model 210. In some examples, each outlier event is identified by the filter 206 as either a braking event (acceleration and/or deceleration exceeds a selected threshold) or a steering event (change in vehicle wheel direction or change in vehicle direction exceeds a selected threshold). Braking events are output to the braking simulation model 208, and steering events are output to the steering simulation model 210.

According to various implementations, the braking simulation model 208 and the steering simulation model 210 are gradient boosted classification models. According to some implementations, the braking simulation model 208 and the steering simulation model 210 are logistic regression models. The models 208, 210 include both acceleration and NPC proximity data as input parameters for determining an automated comfort score. In some examples, the models 208, 210 filter the acceleration signal to create a metric that is sensitive to uncomfortable frequencies of motion. According to some implementations, the braking simulation model 208 and the steering simulation model 210 are machine learning models.

The braking simulation model 208 and the steering simulation model 210 each output a probability of an event being a ride quality event. In some examples, the braking simulation model 208 and the steering simulation model 210 use kinematic data from each road segment, as well as data on proximity of another road user, pedestrian, or animal (proximity of a NPC) to generate potential ride quality events 212. Thus, for example, a hard brake in which an NPC is almost hit will be given a higher probability that the event is a ride quality event than a hard brake because a traffic light turns red unexpectedly quickly, reflecting increased passenger discomfort at almost hitting a pedestrian as compared to stopping at a light.

In some examples, the braking simulation model 208 measures how quickly the vehicle accelerated or decelerated in a longitudinal direction and how quickly the vehicle accelerated or decelerated in a lateral direction. Vehicle acceleration and deceleration in any direction is measured by the braking simulation model 208. The more quickly the vehicle accelerated or decelerated, the greater the probability of a ride quality event. In some examples, the steering simulation model 210 measures wheel turn angle to determine if the autonomous vehicle experienced a hard swerve. The greater the turn angle, the greater the probability of a ride quality event. Additionally, the closer the vehicle came to an NPC, the greater the probability of a ride quality event.

The braking simulation model 208 and the steering simulation model 210 each output an event discomfort score for each identified outlier event. The potential ride quality events 212 include the event discomfort score for each identified outlier event.

The potential ride quality events 212 are input to a severity level assignment module 214, which assigns a severity score to each event based on kinematic data. In various examples, the severity of an identified outlier event is assigned a numerical value. In one example, a higher numerical value indicates a more severe event.

The potential ride quality events 212 and the severity scores for each event from the severity level assignment module 214 are input to a ride quality module 216 which determines a ride disruption index for each road segment. The ride quality module 216 determines a ride disruption index for an entire trip by summing the severity levels and autonomously driven miles across the generated road segments in the trip. In some examples, the ride quality module 216 determines a ride disruption index by summing the severity levels across all generated road segments for a selected autonomous vehicle configuration (e.g., a selected software version). In some examples, the ride quality module 216 determines a ride disruption index by summing the severity levels across all autonomously driven miles for a selected autonomous vehicle configuration. In some examples, the ride quality module 216 determines a ride disruption index by summing the severity levels across a selected number (or percentage) of generated road segments for a selected autonomous vehicle configuration (e.g., a selected software version). In some examples, the ride quality module 216 determines a ride disruption index by summing the severity levels across a selected number (or percentage) of autonomously driven miles for a selected autonomous vehicle configuration. In one example, the ride disruption index score is the sum of the severity ratings for each ride quality event 212 divided by the number of miles driven by the vehicle during the events summed:

$$\text{Ride Disruption Index} = \frac{\sum_{i=0}^{n} \text{severity rating}_i}{\text{auto\_miles}}$$

In some examples, the ride disruption index can be determined for each road segment, for multiple road segments, and/or for the duration of a passenger ride. The ride disruption index for a ride can be used as a comfort score for the ride, and is automatically generated. In some examples, the ride disruption index is used in combination with other ride comfort metrics to generate a comfort score.

Example Methods for an Automated Comfort Score

Figure 3A:
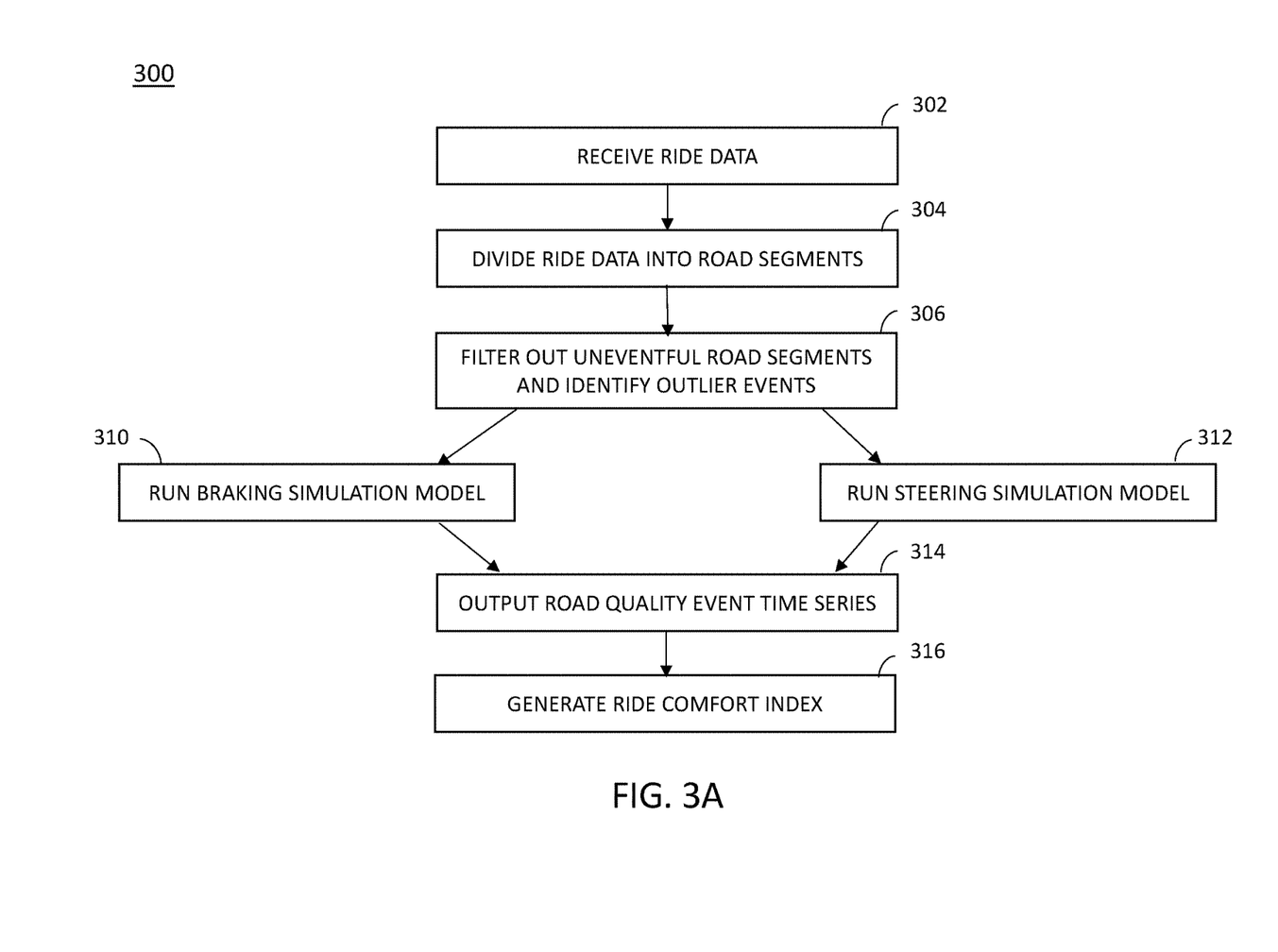
FIG. 3A is a flow chart illustrating a method for generating an automated comfort score, according to various examples of the present disclosure.

FIG. 3A is a flow chart illustrating a method 300 for generating an automated comfort score, according to various examples of the present disclosure. At step 302, ride data is received and at step 304, the ride data is divided into road segments. In some examples, ride data includes data for an entire ride. In other examples, ride data are continuously processed during a ride. In some examples, ride data is periodically transmitted to an automated comfort score generator.

Optionally, at step 306, the road segments are transmitted to a filter that filters out uneventful road segments, with eventful road segments output to the braking and steering simulation models. In some examples, filtering out uneventful road segments includes filtering out road segments in which acceleration data remains below a selected threshold throughout the road segment. Similarly, in some examples, filtering out uneventful road segments includes filtering out road segments in which steering direction change remains below a selected threshold. If either acceleration data or steering direction data exceeds the selected threshold during a particular road segment, the road segment is not filtered out, but is output to the braking and steering simulation models for further processing.

The road segments are filtered to identify outlier events. In some examples, the road segments are input to a filter which identifies outlier events. In particular, the filter is designed to filter out typical patterns of acceleration data and identify outlier acceleration events. Similarly, the filter is designed to filter out typical patterns of steering direction data and identify outlier steering direction events. Additionally, the filter is designed to filter out typical patterns of other road user (NPC) proximity data and identify outlier proximity events.

Outlier acceleration event data is input to a braking simulation model. Additionally, outlier proximity event data is input to the braking simulation model. At step 310, the braking simulation model evaluates the outlier acceleration event data and any corresponding outlier proximity event data and generates a severity score for each acceleration event. In this manner, hard braking events are evaluated by the braking simulation model, including situational aspects related to hard braking events which could increase the discomfort of passengers during the hard braking events.

Outlier steering direction event data is input to a steering simulation model. Additionally, outlier proximity event data is input to the steering simulation model. At step 312, the steering simulation model evaluates the outlier steering direction event data and any corresponding outlier proximity event data and generates a severity score for each steering direction event. In this manner, vehicle swerves are evaluated by the steering simulation model, including situational aspects related to hard swerve events which could increase the discomfort of passengers during the hard swerve events.

At step 314, severity score data from the braking simulation model and severity score data from the steering simulation model are used to generate a road quality event time series. In particular, the severity score data for each outlier event from the braking simulation model and the steering simulation model is used to generate a road quality event score for each road segment. The road quality event score for each road segment is arranged chronologically in the order in which the road segments occurred, resulting in the time series of road quality events. At step 316, the road quality events for multiple road segments in a ride are used to generate a ride comfort index for the ride.

In various implementations, the ride comfort index can be used as an objective measure of the comfort level of a ride. In some examples, the ride comfort level can be used to identify uncomfortable rides and offer apologies, explanations, or various forms of compensation to users who experienced an uncomfortable ride. For instance, a user who experienced an uncomfortable ride may be sent a coupon for a rebate on a future ride to encourage the user to try the service again.

In some examples, as described below with respect to FIG. 4B, changes in the comfort level of rides across a fleet can be used to identify vehicle changes that resulted in the change in comfort levels. For instance, if a decrease in comfort level across a set of vehicles occurs after the vehicles install a new software update, this may indicate that the software update caused the decreased comfort level. If it is determined that the software update caused the decreased comfort level, the software update can be rolled back or the software can be further updated to re-adjust metrics that caused the decreased comfort level metrics.

Figure 3B:
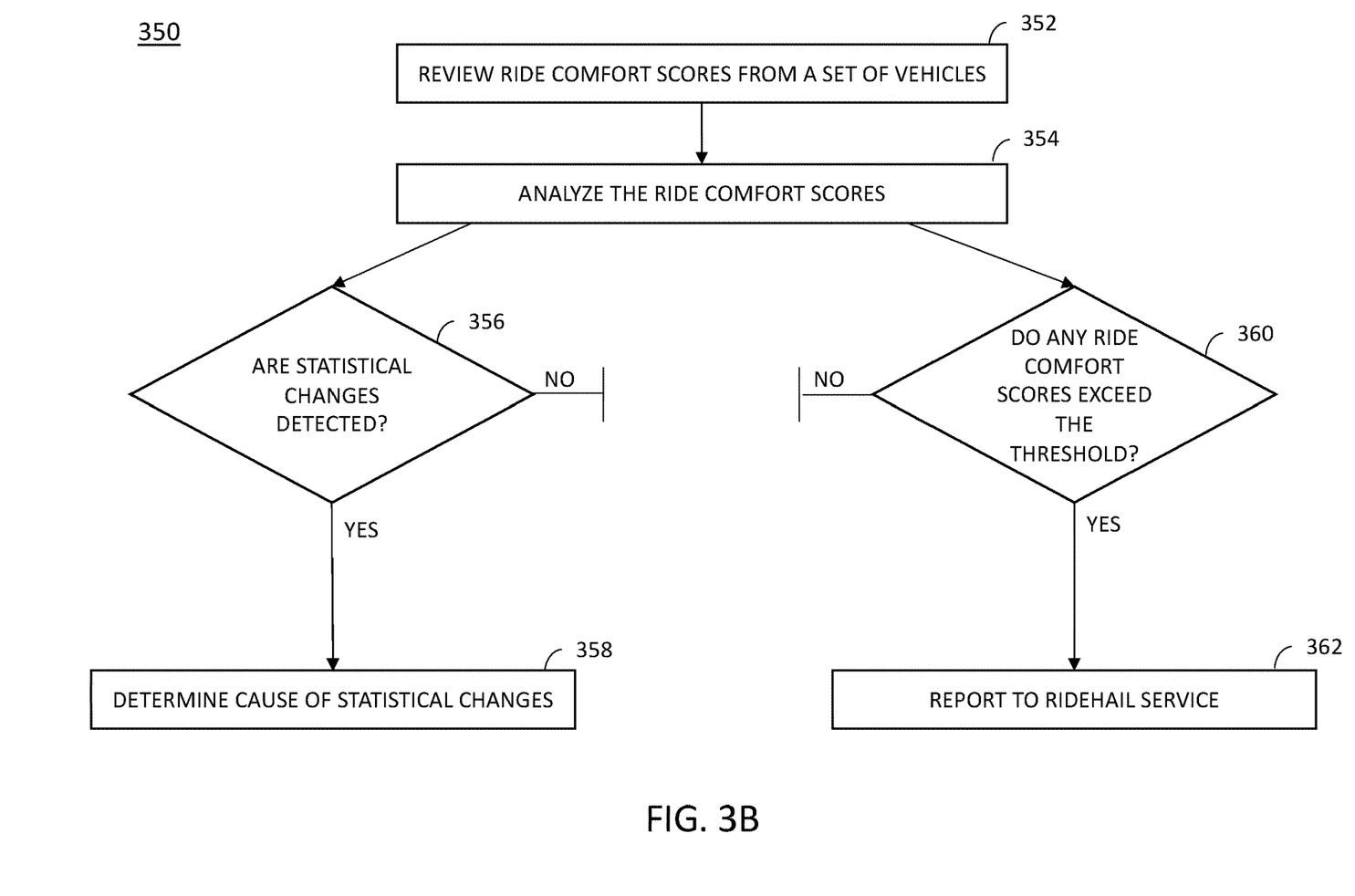
FIG. 3B is a flow chart illustrating a method for reviewing automated comfort scores generated by a fleet of vehicles, according to various examples of the present disclosure.

FIG. 3B is a flow chart illustrating a method 350 for reviewing automated comfort scores generated by a fleet of vehicles, according to various examples of the present disclosure. At step 352, automated ride comfort scores from a set of vehicles is received. In some examples, the automated ride comfort scores can be received at a central computer. At step 354, the received automated ride comfort scores are analyzed. Analyzing the received automated ride comfort scores can include statistically analyzing the scores to detect changes over time. At step 356, it is determined whether any statistical changes are detected in the automated comfort scores. In some examples, the automated comfort scores are analyzed periodically, such as hourly, daily, or weekly. In some examples, the automated comfort scores from a selected period are grouped together for the statistical analysis and to compare various selected periods.

If, at step 356, statistical changes are detected, the method 350 proceeds to step 358 to identify the cause of the changes. In some examples, recent vehicle software updates, firmware updates, and/or component updates can be reviewed. Additionally, the locations of outlier events can be reviewed to determine if there is a location or area that is frequently causing outlier events and should be avoided. If, at step 356, no statistical changes are detected, the method 350 ends.

At step 354, the method 350 also proceeds to step 360, where it is determined whether any of the received ride comfort scores exceed a selected threshold. In some examples, ride comfort scores that exceed the selected threshold are classified as uncomfortable rides and/or rides in which a passenger may have experienced discomfort. If, at step 360, ride comfort scores exceeding the selected threshold are detected, the method proceeds to step 362, and the corresponding rides are identified and reported to the ridehail service. The ridehail service can then contact users who ordered the corresponding rides to acknowledge possible discomfort and/or apologize for the discomfort. The ridehail service may also offer the users a rebate or coupon for a future ride as compensation for the discomfort and/or to encourage the user to use the ridehail service again despite the discomfort.

Example Autonomous Vehicle (AV) Management System

Figure 4A:
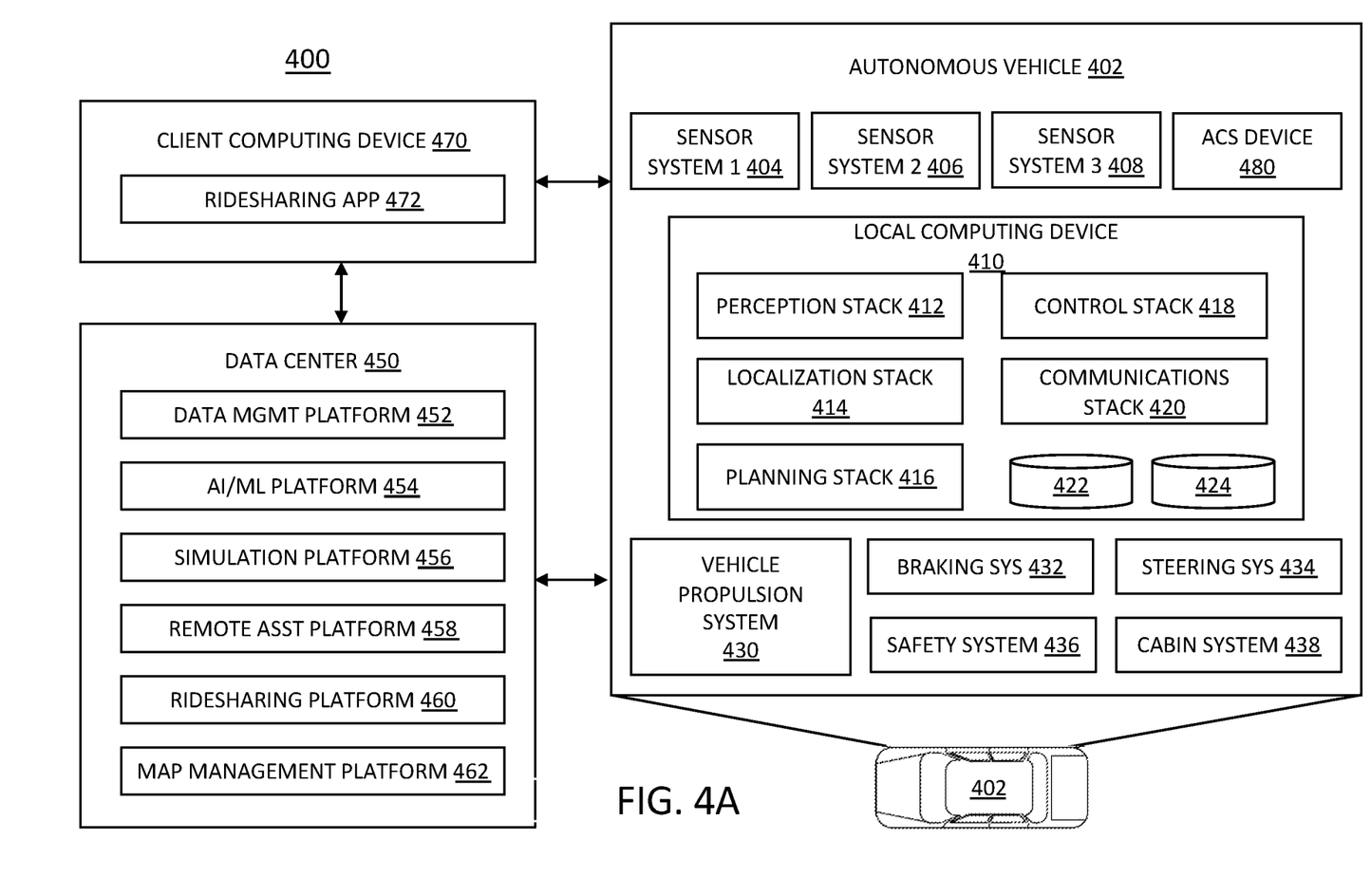
FIG. 4A illustrates an example system environment that can be used to facilitate autonomous vehicle (AV) dispatch and operations, according to some aspects of the disclosed technology.

Turning now to FIG. 4A, this figure illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise IMUs, cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., GPS receivers), audio sensors (e.g., microphones, SONAR systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors. In various examples, the sensor systems 404, 406, and/or 408 can be used to detect the proximity of another road user or NPC, and the proximity data can be used in determining an automated comfort score for a ride, as described above.

The AV 402 can also include an automated comfort score device 480 for generating an automated comfort score as described herein. The automated comfort score device 480 receives data from the sensor systems 404, 406, 408, including accelerometer data, steering direction data, and proximity data to generate an automated comfort score.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, a wheel braking system (e.g., a disc braking system that utilizes brake pads), hydraulics, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an High Definition (HD) geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image or video data, RADAR data, GPS data, and other sensor data that the data center 450 can use for creating or updating AV geospatial data as discussed further below with respect to FIG. 5 and elsewhere in the present disclosure.

The data center 450 can be a private cloud (e.g., an enterprise network, a co-location provider network, etc.), a public cloud (e.g., an IaaS network, a PaaS network, a SaaS network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and the client computing device 470. These signals can include sensor data captured by the sensor systems 404-408, roadside assistance requests, software updates, ridesharing pick-up and drop-off instructions, and so forth. In this example, the data center 450 includes one or more of a data management platform 452, an Artificial Intelligence/Machine Learning (AI/ML) platform 454, a simulation platform 456, a remote assistance platform 458, a ridesharing platform 460, and a map management platform 462, among other systems.

Data management platform 452 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, Unmanned Aerial Vehicles (UAVs), satellites, third-party mapping services, and other sources of geospatially referenced data. The raw data can be processed, and map management platform 462 can render base representations (e.g., tiles (2D), bounding volumes (3D), etc.) of the AV geospatial data to enable users to view, query, label, edit, and otherwise interact with the data. Map management platform 462 can manage workflows and tasks for operating on the AV geospatial data. Map management platform 462 can control access to the AV geospatial data, including granting or limiting access to the AV geospatial data based on user-based, role-based, group-based, task-based, and other attribute-based access control mechanisms. Map management platform 462 can provide version control for the AV geospatial data, such as to track specific changes that (human or machine) map editors have made to the data and to revert changes when necessary. Map management platform 462 can administer release management of the AV geospatial data, including distributing suitable iterations of the data to different users, computing devices, AVs, and other consumers of HD maps. Map management platform 462 can provide analytics regarding the AV geospatial data and related data, such as to generate insights relating to the throughput and quality of mapping tasks.

In some embodiments, the map viewing services of map management platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Example Autonomous Vehicle Fleet

Figure 4B:
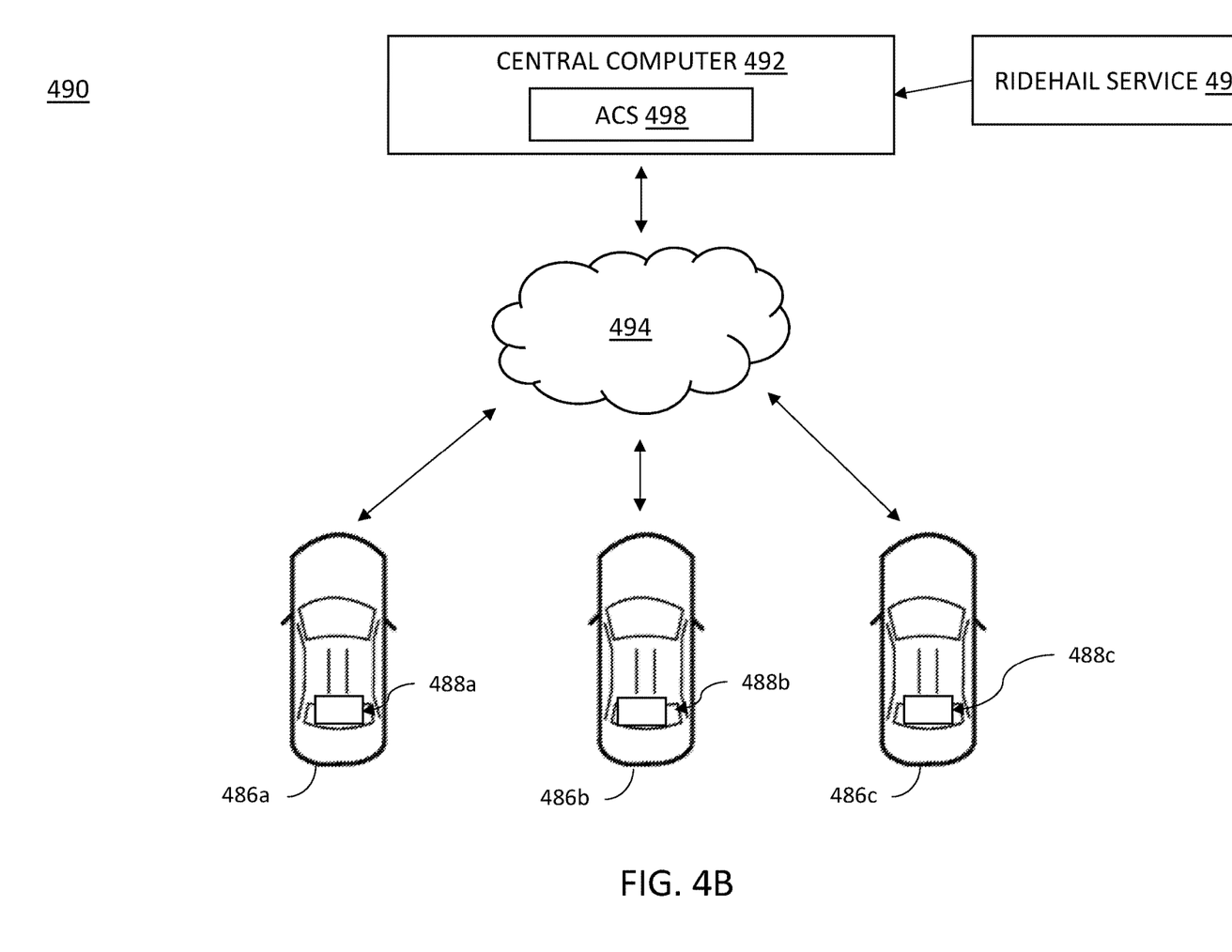
FIG. 4B illustrates a fleet of autonomous vehicles in communication with a central computer, according to some examples of the present disclosure.

FIG. 4B is a diagram 490 illustrating a fleet of autonomous vehicles 486a, 486b, 486c in communication with a central computer 492, according to some examples of the present disclosure. The central computer 492 includes an automated comfort score module 498. The vehicles 486a-486c are substantially similar to the vehicle 402 of FIG. 4A and can include the components discussed with respect to vehicle 402. The vehicles 486a-486c communicate wirelessly with a cloud 494 and a central computer 492. The central computer 492 includes a database of information from the vehicles 486a-486c in the fleet. Autonomous vehicle fleet routing refers to the routing of multiple vehicles in a fleet. The central computer 492 also acts as a centralized ride management system and communicates with ridehail users via a ridehail service 496. In various examples, the ridehail service 496 includes a rideshare service (and rideshare users) as well as an autonomous vehicle delivery service. Via the ridehail service 496, the central computer receives ride requests from various user ridehail applications. In some implementations, the ride requests include a pick-up location, a drop-off location, and/or a stopping location. In some examples, vehicles 486a-486c in fleet each include an automated comfort score device 488a, 488b, 488c, which generate an automated comfort score (or ride comfort index) for each ride, as described above. The vehicles 486a-486c can communicate comfort score information to the central computer 492. The autonomous vehicles 486a-486c each include various sensors, such as accelerometers, steering direction sensors, and proximity sensors.

According to various examples, the central computer 492 stores received comfort scores from the fleet of autonomous vehicles 486a, 486b, 486c. In some examples, the central computer 492 includes an automated comfort score module 498 to receive and process the comfort scores from the autonomous vehicles 486a, 486b, 486c. When the automated comfort score module 498 receives a comfort score that is above a selected threshold (indicating an uncomfortable ride for a passenger), the central computer 492 alerts the ridehail service 496 of the uncomfortable ride. The ridehail service 496 can contact the user who ordered the ride, acknowledge the discomfort, and/or apologize for the discomfort. The ridehail service 496 can contact the user who ordered the ride and offer a rebate on a future ride. The rebate can serve as compensation for the discomfort, and it can serve to encourage the user to try the ridehail service again.

In some implementations, the automated comfort score module 498 periodically reviews the aggregate comfort scores received from the fleet of autonomous vehicles 486a, 486b, 486c to identify any changes in the comfort scores over time. For instance, the average comfort score can be monitored, the mean comfort score can be monitored, the number of comfort scores exceeding the selected threshold can be monitored, and other statistics of the comfort scores can be monitored. If a statistical change in the comfort score measurements for a vehicle fleet (or a subset of a vehicle fleet) is detected at the central computer, any recent changes to the vehicles in the fleet can be reviewed to determine the cause of the change. For example, recent vehicle software updates, firmware updates, and/or component updates can be reviewed. Additionally, the locations of outlier events can be reviewed to determine if there is a location or area that is frequently causing outlier events and should be avoided.

Example Processing System

Figure 5:
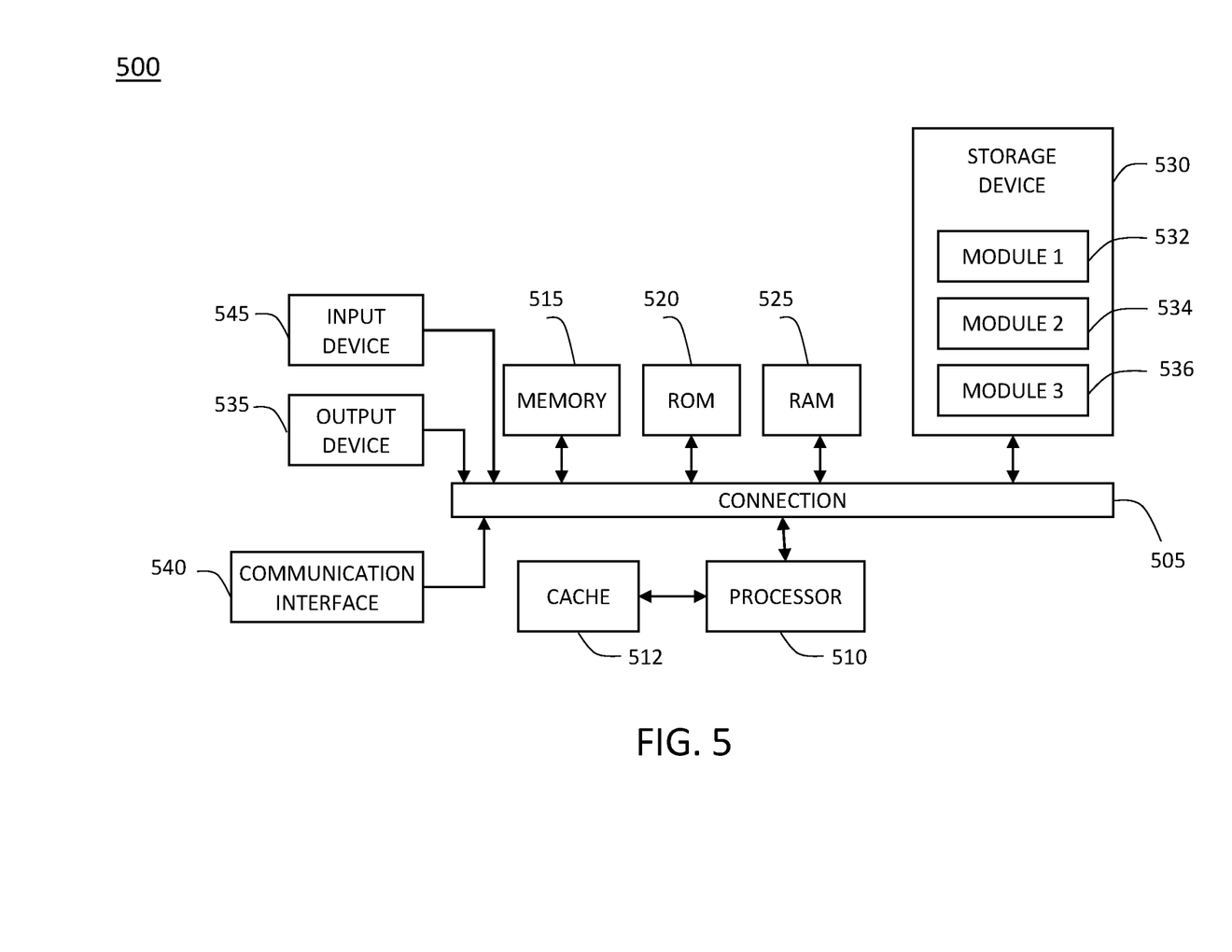
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric. The services 532, 534, 536, can include an automated comfort score device for generating a ride comfort index or ride comfort score.

In some examples, the system 500 can be a central computer such as the central computer 492 discussed with respect to FIG. 4B. One or more of the services 532, 534*m* and 536 can be an automated comfort score device such as the automated comfort score device 498. The input 545 can include input from various autonomous vehicles 486*a*-486*c*. The output 535 can include output to the various autonomous vehicles 486*a*-486*c*, such as updates, routes, maps, etc.

In some examples, the system 500 can be a computer system in an autonomous vehicle. The services 532, 534, 536, can include an automated comfort score device for generating a ride comfort index or ride comfort score. The output 535 can include ride comfort score data. The input 545 can include vehicle updates, route data, updated maps, and other data transmitted to an autonomous vehicle from a central computer, routing coordinator, or from another autonomous vehicle.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc (CD) Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a method for method for generating a ride comfort index for a vehicle ride, comprising: dividing the vehicle ride into a plurality of road segments; receiving sensor data, for each of the plurality of road segments: processing the set of road segments at a machine learning module to identify road segments having at least one outlier event; assigning a severity level to each outlier event of the identified road segments based on the sensor data; and generating the ride comfort index for each of the respective identified road segments based on the assigned severity level of each outlier event in the respective identified road segment.

Example 2 provides a method, system, and/or vehicle according to one or more of the preceding and/or following examples, wherein the sensor data includes: acceleration data from an accelerometer, wheel direction change data from a steering sensor, and proximity of other road users data from a proximity sensor.

Example 3 provides a method, system, and/or vehicle according to one or more of the preceding and/or following examples, wherein assigning the severity level to each outlier event includes assigning the severity level based on at least one of the acceleration data, the wheel direction change data, and the proximity of other road users data for the at least one outlier event.

Example 4 provides a method, system, and/or vehicle according to one or more of the preceding and/or following examples, wherein assigning the severity level to each outlier event includes applying a simulation model to each outlier event to generate the severity level.

Example 5 provides a method, system, and/or vehicle according to one or more of the preceding and/or following examples, wherein applying the simulation model includes applying a braking simulation model based on the acceleration data and the proximity data, and applying a steering simulation model based on the wheel direction change data and the proximity data.

Example 6 provides a method, system, and/or vehicle according to one or more of the preceding and/or following examples, further comprising filtering the plurality of road segments at a pre-filter to identify a set of eventful road segments based on the sensor data, and wherein processing the set of road segments comprises processing the set of eventful road segments.

Example 7 provides a method, system, and/or vehicle according to one or more of the preceding and/or following examples, wherein identifying the set of eventful road segments includes identifying road segments for which sensor data exceeds a selected threshold.

Example 8 provides a vehicle for evaluating ride comfort of a vehicle ride, comprising: an onboard computer to divide the vehicle ride into a plurality of road segments; vehicle sensors to generate vehicle sensor data for each of the plurality of road segments; and a processor to process the set of road segments and identify road segments having at least one outlier event; wherein the onboard computer is further to: assign a severity level to each outlier event of the identified road segments based on the sensor data, and generate a ride comfort index for each of the respective identified road segments based on the assigned severity level of each outlier event in the respective identified road segment.

Example 9 provides a method, system, and/or vehicle according to one or more of the preceding and/or following examples, wherein the vehicle sensors include: an accelerometer to generate acceleration data, a steering sensors to generate wheel direction change data, and a proximity sensor to generate proximity data indicating a proximity of other road users.

Example 10 provides a method, system, and/or vehicle according to one or more of the preceding and/or following examples, wherein the onboard computer is to assign the severity level to each outlier event based on at least one of: the acceleration data, the wheel direction change data, and the proximity data, for the at least one outlier event.

Example 11 provides a method, system, and/or vehicle according to one or more of the preceding and/or following examples, wherein the onboard computer is further to apply a simulation model to each outlier event to generate the severity level.

Example 12 provides a method, system, and/or vehicle according to one or more of the preceding and/or following examples, wherein the onboard computer is further to apply a braking simulation model based on the acceleration data and the proximity data, and apply a steering simulation model based on the wheel direction change data and the proximity data.

Example 13 provides a method, system, and/or vehicle according to one or more of the preceding and/or following examples, further comprising a filter to filter the plurality of road segments and identify a set of eventful road segments based on the sensor data, and wherein the set of road segments processed at the machine learning module is the set of eventful road segments.

Example 14 provides a method, system, and/or vehicle according to one or more of the preceding and/or following examples, wherein the filter is to identify the set of eventful road segments by identifying road segments for which sensor data exceeds a selected threshold.

Example 15 provides a system for evaluating ride comfort, comprising: a fleet of vehicles, each vehicle having: vehicle sensors to generate vehicle sensor data for each of a plurality of road segments of a vehicle ride; a processor to process the set of road segments and identify road segments having at least one outlier event;

and an onboard computer to assign a severity level to each outlier event of the identified road segments based on the sensor data, and generate a ride comfort score for the vehicle ride based on the assigned severity level of each of the respective identified road segments; and a central computer to: receive ride comfort scores from each vehicle in the fleet of vehicles, identify a change in ride comfort scores over time, and determine a cause of the change.

Example 16 provides a method, system, and/or vehicle according to one or more of the preceding and/or following examples, wherein the central computer is further to identify a low ride comfort score, determine the corresponding ride, and transmit a message to a passenger in the corresponding ride.

Example 17 provides a method, system, and/or vehicle according to one or more of the preceding and/or following examples, wherein the vehicle sensors of each vehicle include: an accelerometer to generate acceleration data, a steering sensors to generate wheel direction change data, and a proximity sensor to generate proximity data indicating a proximity of other road users.

Example 18 provides a method, system, and/or vehicle according to one or more of the preceding and/or following examples, wherein the onboard computer of each vehicle is to assign the severity level to each outlier event based on at least one of: the acceleration data, the wheel direction change data, and the proximity data, for the at least one outlier event.

Example 19 provides a method, system, and/or vehicle according to one or more of the preceding and/or following examples, wherein the onboard computer of each vehicle is further to apply a simulation model to each outlier event to generate the severity level.

Example 20 provides a method, system, and/or vehicle according to one or more of the preceding and/or following examples, wherein the onboard computer of each vehicle is further to apply a braking simulation model based on the acceleration data and the proximity data, and apply a steering simulation model based on the wheel direction change data and the proximity data.

Example 21 provides a method for method for generating a ride comfort index for a vehicle ride, comprising: dividing the vehicle ride into a plurality of road segments; receiving sensor data, for each of the plurality of road segments: filtering the set of road segments at a filter to filter out uneventful road segments and identify road segments having at least one outlier event; assigning a severity level to each outlier event of the identified road segments based on the sensor data; and generating the ride comfort index for each of the respective identified road segments based on the assigned severity level of each outlier event in the respective identified road segment.

Example 22 provides a vehicle for evaluating ride comfort of a vehicle ride, comprising: an onboard computer to divide the vehicle ride into a plurality of road segments; vehicle sensors to generate vehicle sensor data for each of the plurality of road segments; and a filter to filter the set of road segments, filter out uneventful road segments, and identify road segments having at least one outlier event; wherein the onboard computer is further to: assign a severity level to each outlier event of the identified road segments based on the sensor data, and generate a ride comfort index for each of the respective identified road segments based on the assigned severity level of each outlier event in the respective identified road segment.

Example 23 provides a system for evaluating ride comfort, comprising: a fleet of vehicles, each vehicle having: vehicle sensors to generate vehicle sensor data for each of a plurality of road segments of a vehicle ride; a filter to filter the set of road segments, filter out uneventful road segments, and identify road segments having at least one outlier event; and an onboard computer to assign a severity level to each outlier event of the identified road segments based on the sensor data, and generate a ride comfort score for the vehicle ride based on the assigned severity level of each of the respective identified road segments; and a central computer to: receive ride comfort scores from each vehicle in the fleet of vehicles, identify a change in ride comfort scores over time, and determine a cause of the change.

Example 24 provides a computer-readable medium for performing the method of any of the examples 1-23.

Example 25 includes an apparatus comprising means for performing the method of any of the examples 1-24.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method for generating a ride comfort index for a vehicle ride, comprising:
    dividing the vehicle ride into a plurality of road segments;
    receiving sensor data comprising proximity data indicating proximity to non-player characters (NPCs);
    identifying road segments having a corresponding at least one outlier event;
    for each respective identified road segment:
        based on the corresponding at least one outlier event, selecting a simulation model from among a braking simulation model and a steering simulation model;
        assigning a severity level to the corresponding at least one outlier event using the selected simulation model based on kinematic data associated with the corresponding at least one outlier event and the proximity data indicating proximity to NPCs during the corresponding at least one outlier event, wherein the assigned severity level is increased as proximity to NPCs is increased; and
        generating the ride comfort index for the respective identified road segment based on the assigned severity level of the corresponding at least one outlier event;
    determining that at least one generated ride comfort index satisfies a predetermined comfort threshold; and
    based on determining that the at least one generated ride index satisfies the predetermined comfort threshold, transmitting an alert message to a remote ride-hail service computer system, the alert message indicating a passenger of a vehicle associated with the vehicle ride potentially experienced discomfort.

2. The method of claim 1, wherein the sensor data includes:
acceleration data from an accelerometer; and
wheel direction change data from a steering sensor.

3. The method of claim 2, wherein the assigned severity level is based on at least one of the acceleration data and the wheel direction change data.

4. The method of claim 1, wherein the selected simulation model comprises a gradient boosted classification model.

5. The method of claim 1, wherein the selected simulation model comprises a logistic regression model.

6. The method of claim 1, further comprising filtering the plurality of road segments at a pre-filter to identify a set of eventful road segments based on the sensor data, and wherein processing the set of road segments comprises processing the set of eventful road segments.

7. The method of claim 6, wherein identifying the set of eventful road segments includes identifying road segments for which sensor data exceeds a selected threshold.

8. A vehicle for evaluating ride comfort of a vehicle ride, comprising:
an onboard computer to divide the vehicle ride into a plurality of road segments;
vehicle sensors to generate vehicle sensor data for each of the plurality of road segments; and
a processor to process the plurality of road segments and identify road segments having a corresponding at least one outlier event;
wherein the onboard computer is further to:
for each respective identified road segment:
based on the corresponding at least one outlier event, select a simulation model from among a braking simulation model and a steering simulation model;
assign a severity level to the corresponding at least one outlier event of, using the selected simulation model based on kinematic data associated with the corresponding at least one outlier event and the proximity data indicating proximity to NPCs during the corresponding at least one outlier event, wherein the assigned severity level is increased as proximity to NPCs is increased; and
generate a ride comfort index for the respective identified road segment based on the assigned severity level of the corresponding at least one outlier event;
determine that at least one generated ride comfort index satisfies a predetermined comfort threshold; and
based on determining that the at least one generated ride index satisfies the predetermined comfort threshold, transmit an alert message to a remote ride-hail service computer system, the alert message indicating a passenger of the vehicle potentially experienced discomfort.

9. The vehicle of claim 8, wherein the vehicle sensors include:
an accelerometer to generate acceleration data; and
a steering sensor to generate wheel direction change data.

10. The vehicle of claim 9, wherein the assigned severity level is based on at least one of the acceleration data and the wheel direction change data.

11. The vehicle of claim 8, wherein the selected simulation model comprises a gradient boosted classification model.

12. The vehicle of claim 8, wherein the selected simulation model comprises a logistic regression model.

13. The vehicle of claim 8, further comprising a filter to filter the plurality of road segments and identify a set of eventful road segments based on the vehicle sensor data, and wherein the set of road segments processed at a machine learning module is the set of eventful road segments.

14. The vehicle of claim 13, wherein the filter is to identify the set of eventful road segments by identifying road segments for which sensor data exceeds a selected threshold.

15. A system for evaluating ride comfort, comprising:
a fleet of vehicles, each vehicle having:
vehicle sensors to generate vehicle sensor data for each of a plurality of road segments of a vehicle ride;
a processor to process the plurality of road segments and identify road segments having a corresponding at least one outlier event; and
an onboard computer to:
for each identified road segment:
based on the corresponding at least one outlier event, select a simulation model from among a braking simulation model and a steering simulation model; and
assign a severity level to the corresponding at least one outlier event of, using the selected simulation model based on kinematic data associated with the corresponding at least one outlier event and the proximity data indicating proximity to NPCs during the corresponding at least one outlier event, wherein the assigned severity level is increased as proximity to NPCs is increased;
generate a ride comfort score for the vehicle ride based on the assigned severity level of each of the corresponding at least one outlier events;
determine that at least one generated ride comfort index satisfies a predetermined comfort threshold; and
based on determining that the at least one generated ride index satisfies the predetermined comfort threshold, transmit an alert message to a remote ride-hail service computer system, the alert message indicating a passenger of a vehicle associated with the vehicle ride potentially experienced discomfort; and
a central computer to:
receive ride comfort scores from each vehicle in the fleet of vehicles,
identify a change in ride comfort scores over time, and
determine a cause of the change.

16. The system of claim 15, wherein the central computer transmits a message to the passenger in the corresponding ride.

17. The system of claim 15, wherein the vehicle sensors of each vehicle include:
an accelerometer to generate acceleration data; and
a steering sensor to generate wheel direction change data.

18. The system of claim 17, wherein the assigned severity level is based on at least one of and the acceleration data and the wheel direction change data.

19. The system of claim 15, wherein the selected simulation model comprises a gradient boosted classification model.

20. The system of claim 15, wherein the selected simulation model comprises a logistic regression model.

* * * * *